Nov. 7, 1961  K. RÄNTSCH  3,007,249
OPTICAL DEVICE FOR CORRECT ADJUSTMENT AND READING
OF THE SLIDABLE DISPLACEMENT OF A CARRIAGE
Filed Nov. 24, 1959  5 Sheets-Sheet 2

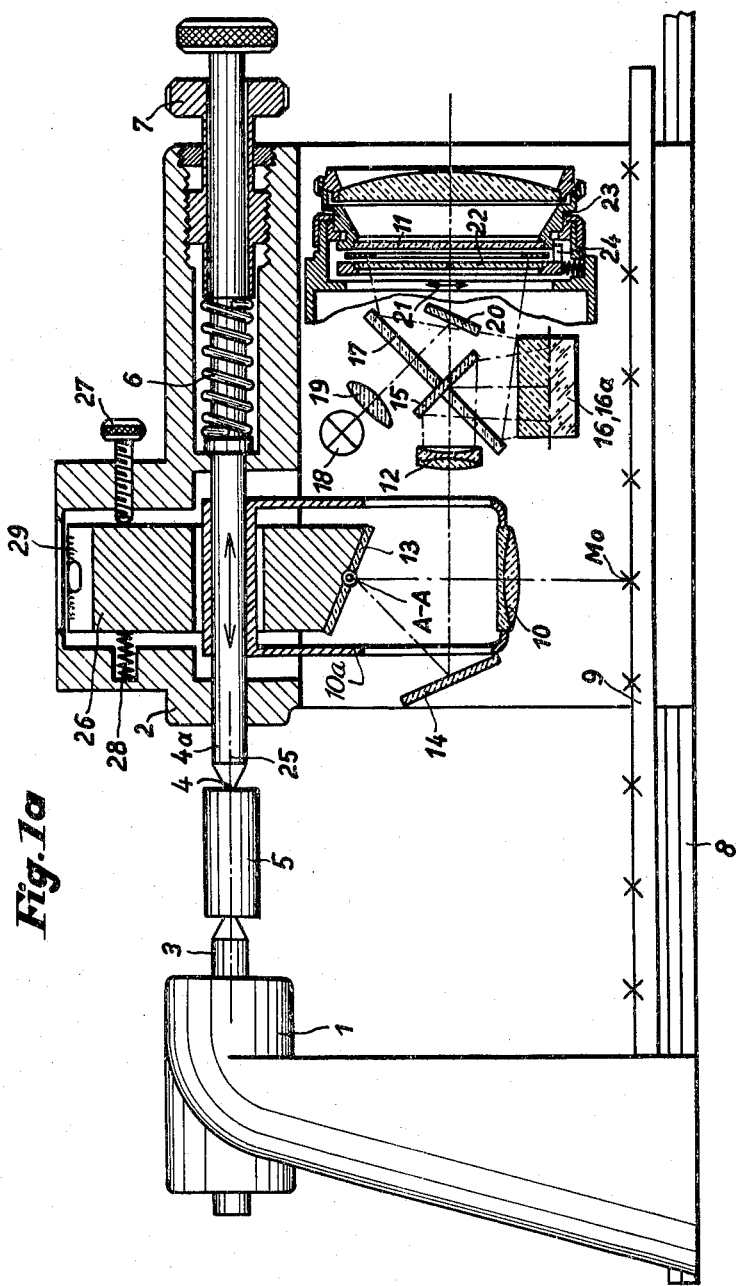

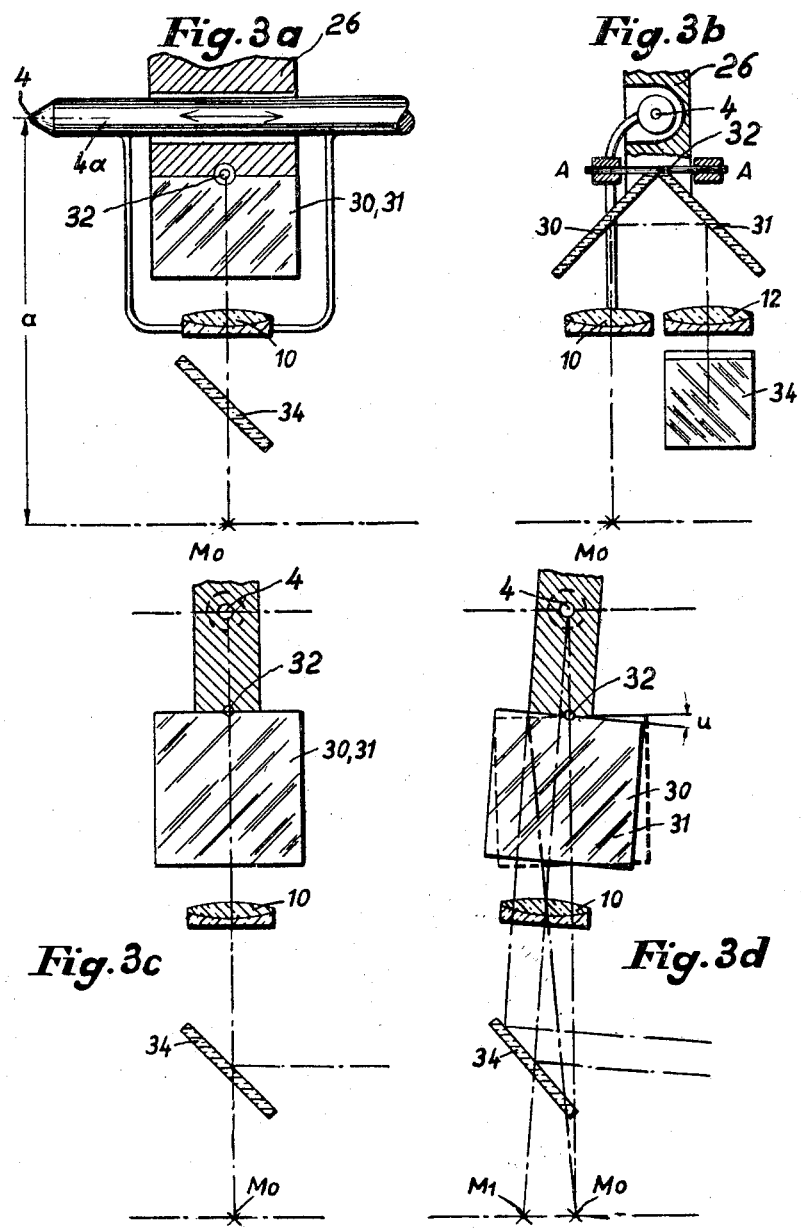

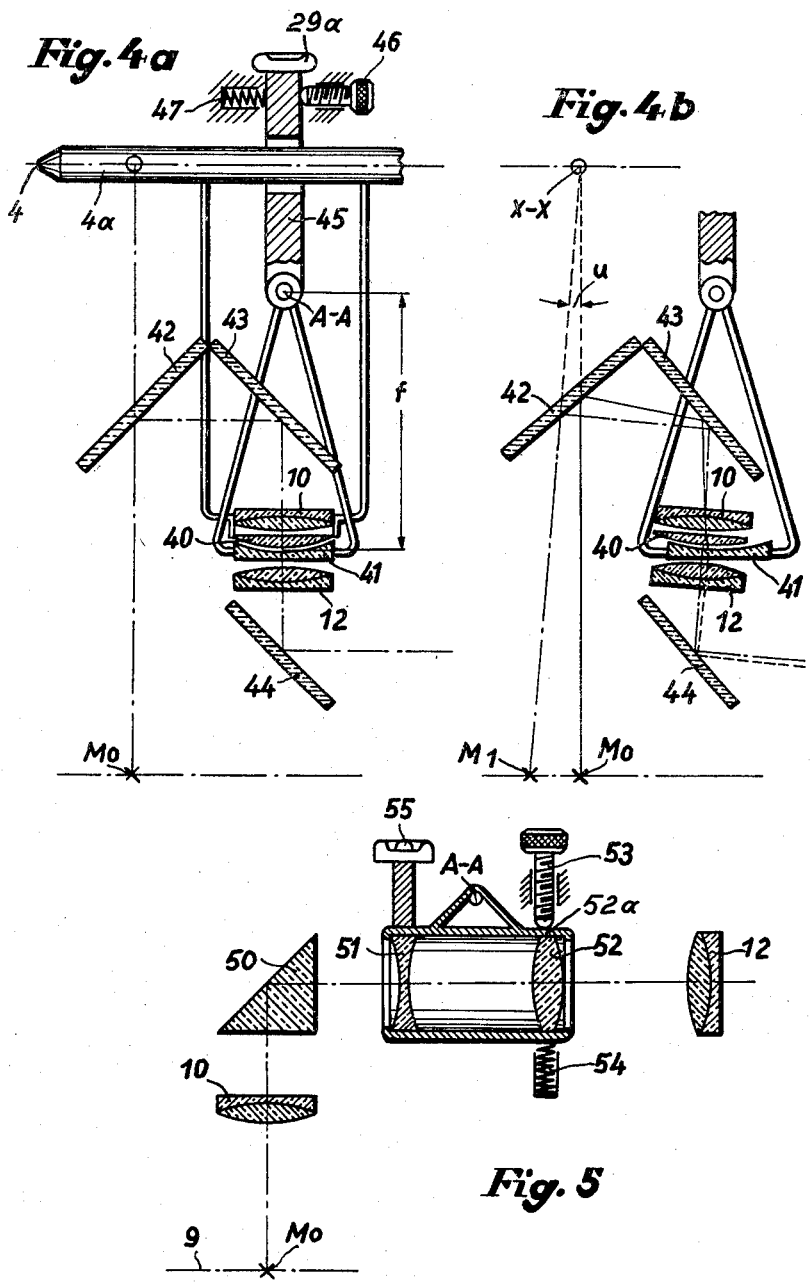

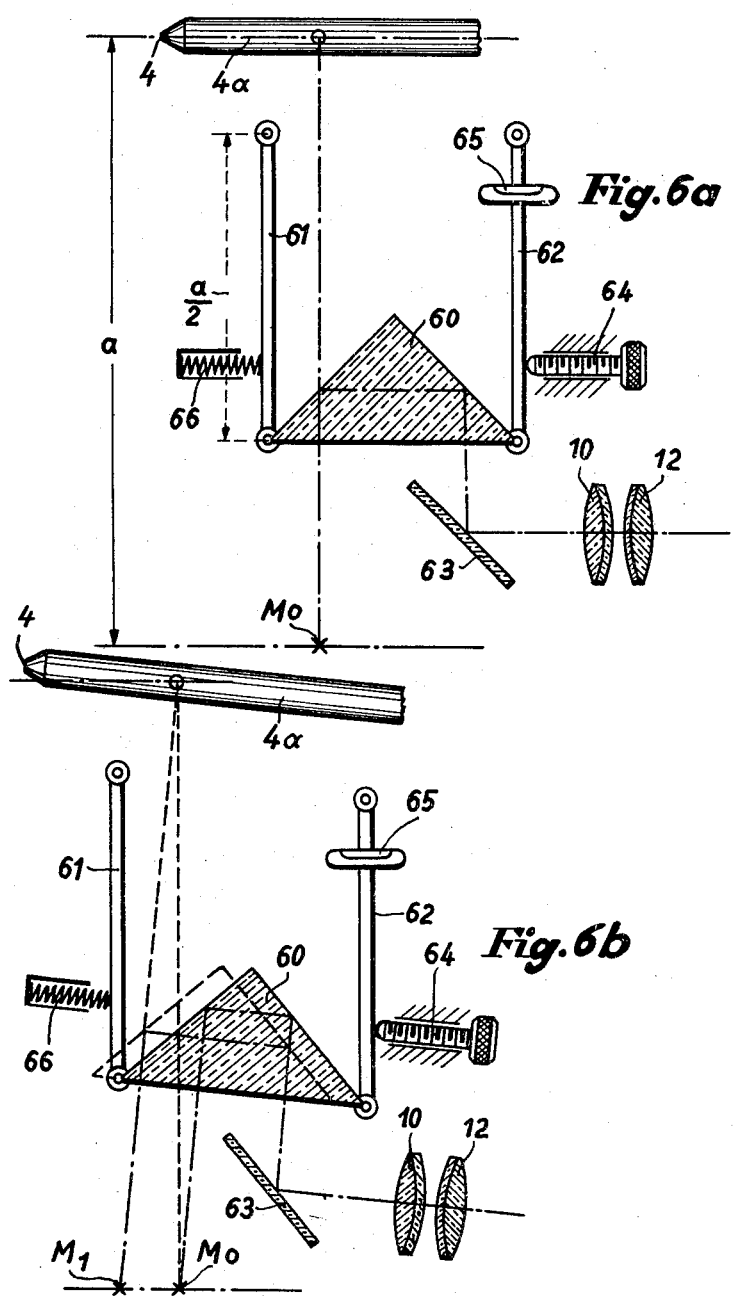

United States Patent Office 3,007,249
Patented Nov. 7, 1961

3,007,249
OPTICAL DEVICE FOR CORRECT ADJUSTMENT AND READING OF THE SLIDABLE DISPLACEMENT OF A CARRIAGE
Kúrt Räntsch, Wetzlar (Lahn), Germany, assignor to M. Hensoldt & Söhne Optische Werke A.G., Wetzlar (Lahn), Germany
Filed Nov. 24, 1959, Ser. No. 855,185
Claims priority, application Germany Nov. 28, 1958
7 Claims. (Cl. 33—147)

The invention relates to an optical device for the correct adjustment and reading of the slidable displacement of a carriage in a machine or in an apparatus such as a machine tool, a length measuring device, or the like, in which the stationary part of the machine is provided with a measuring scale and in which optical elements are provided for projecting an image of a portion of the measuring scale into a reading window which is arranged in the slidable part of the machine or vice versa. It has been proposed already in applicant's co-pending U.S. patent application Serial No. 708,232, filed on January 10, 1958, to arrange in such a device at least one of the optical elements with respect to the guide path of the carriage in such a manner that, when the carriage tilts owing to an inaccuracy in the guide path, this optical element will retain its position in the space so that the errors in the guide path will be compensated in the measuring result. In such a device the optical elements which retain their position are freely suspended in the carriage, and while this prior device is very convenient in its operation, there exists the possibility after the device has been in use for an extended period of time that the suspended elements owing to wear or to fatigue appearances do not react accurately any more upon an inclination of the carriage and do not retain their position in the space. It is an object of the present invention to eliminate this uncertainty in that the projection device is provided with an arbitrarily adjustable direction dependent indicator optical element which is associated with a tubular level or the like.

If in an arrangement in accordance with the present invention the carriage should tilt somewhat in its guide path, for instance about an axis which intersects the measuring axis, then there will appear in the reading window an incorrect measuring value. This is indicated by the fact that, for instance, the tubular level is not horizontal. If now a mirror in the projection device is adjusted in such a manner that the level is horizontal, then one will read in the reading window the correct value of the length of the workpiece which is being measured.

Another object of the invention is to adjust the movable optical element by means of an adjusting screw against the pressure of a spring, if desired, by means of the interposition of levers or the like. In accordance with the first embodiment of the invention, an image of the scale lines of the measuring scale is projected by means of an objective arranged at a distance equal to its focal length from the measuring scale into the reading window, whereby the focal length of the objective is equal to one half the distance of the measuring scale from the measuring plane or workpiece, and in rear of this objective there is arranged an arbitrarily tiltable plane mirror which is connected with a tubular level or other indicating means. If a lateral displacement of the optical projection path is desired, this arbitrarily adjustable plane mirror may be replaced by a reflecting square. The operation is, however, substantially the same.

In accordance with another embodiment of the invention a pair of lenses is arranged in the path of the measuring ray. One of these lenses is stationary, while the other lens is arbitrarily adjustable so that both lenses during the adjustment of the tiltable lens form an optical wedge. The adjustable elements and the means which indicate the position of the optical elements are operatively connected with the adjustable lens.

In still another embodiment of the invention two afocal systems are employed for the deflection of the measuring ray for the purpose of compensating any guide errors. The first afocal system produces an enlargement $N_1$ and is stationary, while the second afocal system produces an enlargement $N_2$ and is suspended in the form of a pendulum. For both these systems the equation $$N_1 + \frac{1}{N_2} = 1$$

is effective. In this particular embodiment the adjustable elements and the indicating means are directly operatively connected with the second afocal system.

In all of these described embodiments of the invention the target ray is deflected when it is tilted outwardly of its original direction. The invention may also be employed for systems which produce a parallel displacement of the target ray and which employ at least one rectangular prism provided with a parallelogram-type guide. According to the invention at least one of the elements of the parallelogram-type guide is rigidly constructed and the direction depending indicator is connected with this rigid element.

With the foregoing and other objects in view, the invention will now be described with reference to the accompanying drawings, in which FIG. 1 illustrates a side elevation view partly in axial section of a length measuring machine which is provided with the compensating elements of the present invention;

FIG. 3a shows a portion of an axial section of a modified embodiment of the invention;

FIG. 3b shows a portion of this modified embodiment at a right angle to FIG. 3a;

FIGS. 3c and 3d show diagrammatically different positions of the measuring ray projection of this embodiment;

FIG. 4a illustrates still another embodiment of the invention;

FIG. 4b shows the embodiment of FIG. 4a in a different position of the measuring ray;

FIG. 5 illustrates still another embodiment of the invention, and

FIGS. 6a and 6b illustrate still another embodiment of the invention in two different positions.

Figure 1B:
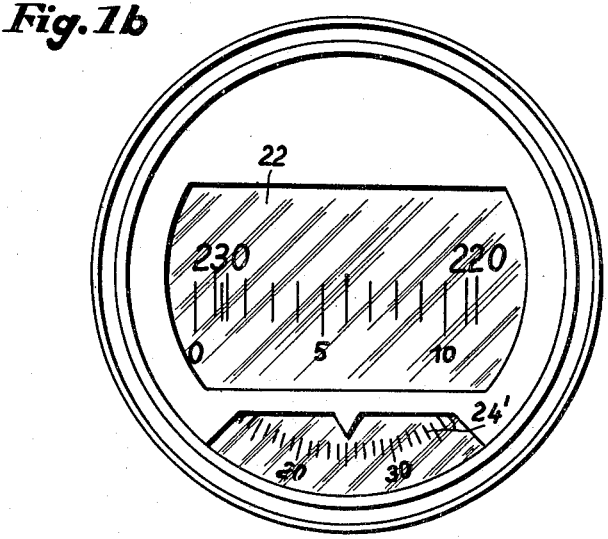
FIG. 1b illustrates the reading window of this machine.

Referring to FIG. 1, the stationary guide path 8 of the length measuring machine has mounted thereon a stationary head carriage 1 and a slidably adjustable partially hollow measuring carriage 2. The head carriage 1 is provided with a point 3 and the measuring carriage 2 with a point 4 between which the workpiece 5 to be measured is clamped. The point 4 is subject to the pressure of a helical spring 6 the pressure of which is adjustable by a sleeve-like adjustment nut 7 mounted in a threaded bore of the carriage 2. The measuring carriage 2 is adjustable along the horizontal guide path 8. Parallel to the guide path 8 is arranged a length measuring scale 9. In the measuring carriage 2 is arranged a reading device which includes an objective lens 10 which is spaced a distance equal to its focal length away from the measuring scale for projecting an image of a portion of the measuring scale 9 into the reading window 11 by means of an interposed lens 12 and reflecting mirrors 13, 14, 15, 16, 16a, and 17. The mirror 15 is partly transparent and is also used for the purpose of illuminating the measuring scale 9. For this purpose there is provided a lamp 18 which projects a light beam by means of a condenser lens 19 and a mirror 20 into the optical axis of the lens 12. In the neighborhood of the reading window 11 is arranged a micrometer measuring scale 22 which is adjustable in the direction of the arrow 21. The slidable adjustment of the micrometer scale 22 is accomplished by means of an eccentric ring 23 which engages a pin 24 attached to the micrometer scale 22. The amount of the rotative movement of the eccentric ring 23 and the displacement of the micrometer scale 22 caused thereby can be observed and read on a scale 24' shown in FIG. 1b.

In determining or measuring the length of the workpiece 5 the measuring carriage 2 is slidably displaced so that the workpiece 5 may be placed between the points 3 and 4. For this purpose the pin 4a with the point 4 thereon is axially displaceable. The pin 4a has fixedly attached thereto the mount 10a of the objective lens 10 so that the measuring result is determined directly by the position of the point 4. When the pressure of the spring 6 is constant, then the device operates independently of the pressure exerted by the point 4 on the workpiece 5, in other words, the pressure of the point 4 need not be considered at all.

In the viewing field of the reading device appears, as shown in FIG. 1b, the image of at least one section of the coarse scale lines of the measuring scale 9. According to the example of the measuring scale 9 shown in FIG. 1a, the scale is a centimeter scale and each scale line is represented by a double line. The FIG. 1b shows the double lines 220 and 230. The micrometer scale 22 indicated by the markings 0–5–10 is displaced by rotating the eccentric ring 23 until one of its scale lines comes to lie within the space formed between the double line of the coarse scale 9. The size of this micrometric displacement can be read on the circular scale 24'. According to FIG. 1b the measuring value indicated in the viewing field of the reading device is 231; 25 millimeters.

Figure 2A:
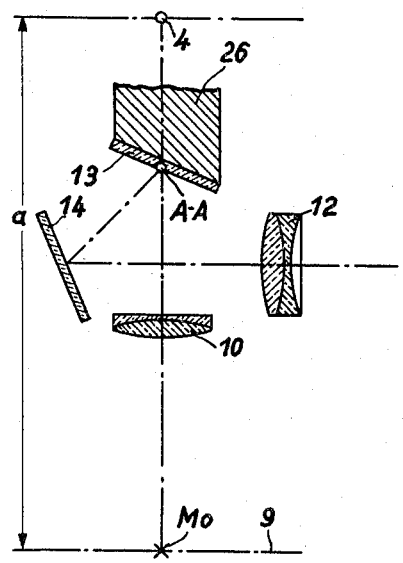
FIGS. 2a and 2b illustrate diagrammatically the projection path of the machine with and without guide path errors, respectively.
Figure 2B:
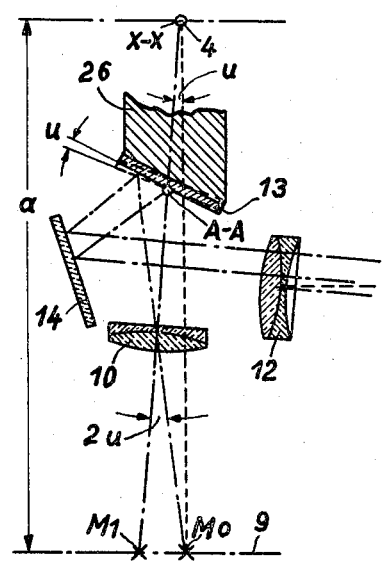

The measuring scale is arranged parallel to the measuring axis 25 (this axis extends along the axis of the points 3 and 4). As soon as the measuring carriage reaches a point of the guide path where the latter has an inaccuracy, the carriage 2 tilts in the guide path and this can be observed in the tubular level 29. The optical axis of the lens 10 no longer points to the measuring point $M_0$ as shown in FIGS. 1a and 2a, but points to an adjacent point, for instance to the point $M_1$ (FIG. 2b). In order to compensate this measuring error, the mirror 13 which is attached to a body 26 has to be arbitrarily rotatably adjusted about the transverse axis A—A in the carriage 2. This rotative adjustment is performed by rotating an adjustment screw 27 against the pressure of a spring 28 which latter is placed in a suitable socket provided in the carriage 2. It will be noted from FIG. 1a that the tubular level 29 is mounted on the upper end of the body 26. The mirror 13 is tilted about the axis A—A until the tubular level 29 indicates a correct horizontal position. In this manner the aforementioned error is compensated as will be described hereafter.

According to FIG. 2a the guide path of the carriage 2 has no inaccuracy whatsoever and the projection of the measuring ray will be as indicated in this figure. The light ray from the measuring point $M_0$ is reflected parallel to the horizontal measuring axis. If, however, the measuring carriage 2 tilts about the axis X—X, for instance through an angle $u$, then the optical axis of the lens 10 would point to the wrong measuring point $M_1$, as indicated in FIG. 2b. This displacement of the optical axis is equal to the tilting movement which the mirror 13 performs through the angle $u$. This is clearly indicated in FIG. 2b which shows the rotative adjustment of the mirror 13. The light ray coming from the measuring point $M_0$ will be parallel to the axis and passes through the focal point of the lens 12 into the reading device. In order that the measuring error be compensated in the desired manner, the focal length of the lens 10 is selected to be equal to $$\frac{a}{2}$$

where $a$ is equal to the distance of the measuring axis 25 from the measuring scale 9.

The FIGS. 3a to 3d illustrate the construction and operation of a modified device for compensating smaller inclinations of the measuring carriage and the reading device. As in the previous embodiment, the objective lens 10 is fixedly connected with the pin 4a of the measuring device. The mirror 13, however, is replaced by a reflecting square 30, 31 fixedly attached at its apex to a horizontal rotatable shaft 32. The measuring ray coming from the measuring point $M_0$ passes through the lens 10 and then, as shown in FIG. 3b, impinges upon the mirror surface 30 and from here is reflected onto the mirror surface 31 and then enters the objective lens 12 and passes through the same onto a mirror 34 which reflects the measuring ray into the reading window.

FIG. 3c illustrates diagrammatically the path of the measuring ray when the carriage 2 has not been tilted.

FIG. 3d illustrates the path of the measuring ray when the measuring carriage 2, as shown in the embodiment of FIG. 2b, has been tilted to an angle $u$. The FIGS. 3d and 3c clearly indicate that the same result will be obtained as in the FIGS. 2b and 2a respectively, when in place of the plane mirror of FIG. 1a the reflecting square 30, 31 is tilted.

The FIGS. 4a and 4b illustrate still another modified construction of the invention. Again as in FIG. 1a the objective lens 10 is fixedly attached to the pin 4a. Between the lens 10 and the lens 12 are arranged two additional lenses 40 and 41. The lens 40 is fixedly mounted in the same manner as the lens 10, but the lens 41 can be arbitrarily rotatably adjusted about the transverse axis A—A. The rotatable adjustment is accomplished by means of a lever arm 45 and an adjustment screw 46 which latter is mounted in the carriage 2 and urges the lever arm 45 against a spring 47 mounted in a socket of the carriage 2. The lever arm 45 carries the tubular level 29a. The measuring ray coming from the measuring point $M_0$ is conducted by the mirrors 42 and 43 into the objective lens 10 and thereupon the measuring ray passes through the lenses 40, 41 and 12 and by means of a mirror 44 is reflected into the reading window. The lenses 40 and 41 have the same but oppositely directed focal length. The axis of rotation A—A is spaced the focal length $f$ from the principal point of the pendulum lens as shown in FIG. 4a. When the measuring carriage 2 assumes its correct position or, in other words, when the measuring carriage 2 has not been tilted, then the reflection of the measuring ray is correct and the reading in the reading device is also correct. If, however, the carriage 2 and therewith the reading device is tilted about the axis X—X at an angle $u$ owing to the occurrence of an inaccuracy in the guide path, then it is required that the lens 41 be adjusted relatively to the lenses 10, 40 and 12. After the lens 41 has been adjusted, the correct position of the same is indicated by the tubular level 29a in that the bubble in the level will appear in the center of the tube. The lenses 40 and 41 according to FIG. 4b form an optical wedge which deflects the light ray coming from the measuring point $M_0$ in such a manner that it reaches the lens 12 parallel to the optical axis of the lens. The lens 12, therefore, collects the deflected ray in its focal plane and projects it into the reading window 11.

FIG. 5 shows still another embodiment of the present invention. In rear of the lens 10, which again is fixedly attached to the pin 4a which represents the point 4, is arranged a rectangular prism 50 which produces an enlargement $N_1 = -1$. In rear of this rectangular prism is arranged an afocal system having the form of a Galilean telescope and consisting of the axially spaced lenses 51 and 52. The enlargement of this Galilean system is $$N_2 = +\frac{1}{2}$$

The prism 50 and the Galilean system 51, 52 comply with the initially mentioned equation $$N_1 + \frac{1}{N_2} = 1$$

The Galilean system 51, 52 is adapted to be arbitrarily rotatably adjusted about the axis A—A which is arranged outside and above the tubular mount 52a containing the lenses 51 and 52. An adjusting screw 53 mounted in carriage 2 and engaging one end of the mount 52a effects an adjustment of the mount 52a against the action of a spring 54. The position of the Galilean system 51, 52 is indicated by a spirit level indicator 55 fixedly secured to the system 51, 52. An inclination of the measuring carriage 2 caused by an inaccuracy of the guide path and a corresponding inclination of the reading device can be compensated by a suitable rotative adjustment of the afocal system 51, 52 and when the spirit level is in its center, the compensation is completed. The measuring ray coming from the measuring point $M_0$ will then be reflected parallel to the optical axis of the lens 12 into the reading device.

In the FIGS. 6a and 6b is illustrated a further embodiment of the invention. A rectangular prism 60 is suspended by means of two rigid lever arms 61 and 62 of a parallelogram-type pendulum system. The length of the lever arms 61 and 62 is equal to $$\frac{a}{2}$$

when $a$ is equal to the distance between the measuring scale 9 and the axis of the pin 4a. The right hand lever arm 62 can be adjusted by the adjusting screw 64 mounted in the carriage 2. This lever arm 62 has fixedly attached thereto a spirit level 65 or the like. The left hand lever arm 61 is engaged by a pressure spring 66 in order to assure a secure engagement of the other lever arm 62 with the end of the adjustment screw 64. It will be noted that the measuring ray coming from the measuring point $M_0$ is twice reflected in the prism 60 and after leaving the prism 60 it is reflected by the mirror 63 and then passes through the lenses 10 and 12 into the reading device. If the measuring carriage should tilt on account of inaccuracies in its guide path, then the adjusting screw 64 is operated until the spirit level 65 indicates a horizontal position. This is illustrated in FIG. 6b, in which the light ray coming from the measuring point $M_0$ is reflected by the prism 60 in order to be reflected again into the optical axis of the lenses 10 and 12 and into the reading device.

What I claim is:

1. In an optical device for the correct adjustment and reading of the displacement of a carriage in a machine, apparatus, and the like, such as a machine tool or a length measuring machine, a partially hollow carriage, a stationary machine part, a guide path thereon for supporting said partially hollow carriage, a measuring scale arranged parallel to said guide path and a measuring axis, a reading device mounted in said carriage, and optical means for projecting an image of a portion of said measuring scale into said reading device, the improvement consisting in the mounting of said optical means in said carriage and in an arbitrarily adjustable optical element for compensating inaccuracies in the position of said carriage caused by errors in said guide path, said optical element forming a part of said optical means, manually operable means for adjusting said optical element, and a position indicating means fixedly connected with said adjustable optical element.

2. In an optical device for the correct adjustment and reading of the displacement of a carriage in a machine, apparatus, and the like, such as a machine tool or a length measuring machine, a partially hollow carriage, a stationary machine part, a guide path thereon for supporting said partially hollow carriage, a measuring scale arranged parallel to said guide path and a measuring axis, a reading device mounted in said carriage, and optical means for projecting an image of a portion of said measuring scale into said reading device, the improvement consisting in the mounting of said optical means in said carriage and in an arbitrarily adjustable optical element for compensating inaccuracies in the position of said carriage caused by errors in said guide path, said optical element forming a part of said optical means, a manually adjustable screw mounted in said carriage for adjusting said optical element, a spring acting against said optical element in opposition to said screw, and a tubular level fixedly connected with said adjustable optical element.

3. An optical device according to claim 1, in which said optical means includes an objective lens arranged at a distance equal to its focal length away from said measuring scale for projecting an image of a portion of said scale into said reading device, said focal length being equal to one-half of the distance between said measuring scale and said measuring axis, said optical element comprising an arbitrarily adjustable mirror mounted in rear of said objective lens having fixedly connected therewith said position indicating means in the form of a tubular level.

4. An optical device according to claim 1, in which said optical means includes an objective lens arranged at a distance equal to its focal length away from said measuring scale for projecting an image of a portion of said scale into said reading device, said focal length being equal to one-half of the distance between said measuring scale and said measuring axis, said optical element comprising an arbitrarily adjustable mirror mounted in rear of said objective lens having fixedly connected therewith said position indicating means in the form of a tubular level, said mirror consisting of a reflecting square which reflects the measuring ray coming from said objective lens transversely to the measuring axis of the device.

5. An optical device according to claim 1, in which said optical means includes at least one pair of lenses of which one lens is stationary and the other is pivotally mounted and forms said arbitrarily adjustable optical element, said pair of lenses forming an optical wedge when said pivotally mounted lens is displaced.

6. An optical device according to claim 1, in which said optical means includes two afocal systems producing enlargements of $N_1$ and $N_2$, respectively, and complying with the equation $$N_1 + \frac{1}{N_2} = 1$$

and in which the second afocal system arranged in the direction of the measuring ray is provided with said position indicating means, said second afocal system being arbitrarily rotatably adjustable about an axis extending at right angles to its optical axis.

7. An optical device according to claim 1, in which said optical means includes an arbitrarily adjustable rectangular prism mounted in a parallelogram-type suspension means and in which at least one element of said parallelogram-type suspension means serves as a carrier for said position indicating means.

References Cited in the file of this patent

UNITED STATES PATENTS

| | | |
|---|---|---|
| 2,474,602 | Turrettini | June 28, 1949 |
| 2,843,001 | Werner | July 15, 1958 |
| 2,863,221 | Toubhans | Dec. 9, 1958 |